United States Patent [19]

Yoshida et al.

[11] 3,895,956
[45] July 22, 1975

[54] WATER PERMEABILITY REDUCING INORGANIC COATING SLURRY COMPOSITION

[75] Inventors: Akitoshi Yoshida; Koichi Asahara; Koichiro Yanagida; Tadanobu Maruyama; Ikue Takatsu; Yoshiko Kumagai, all of Funabashi, Japan

[73] Assignee: Nissan Chemical Industries, Ltd., Tokyo, Japan

[22] Filed: Aug. 21, 1973

[21] Appl. No.: 389,635

[30] Foreign Application Priority Data
Aug. 21, 1972 Japan.............................. 47-83534

[52] U.S. Cl............. 106/193 R; 106/2; 106/197 C; 106/209; 106/287 S; 106/287 SE; 260/29.6 S; 260/29.6 M
[51] Int. Cl....................... C08b 27/04; C08f 45/24
[58] Field of Search....... 106/287 S, 287 SE, 197 C, 106/84, 81, 197 R, 193 J, 38.35, 2, 287 SS; 260/29.6 MN, 29.6 S

[56] References Cited
UNITED STATES PATENTS

| | | | |
|---|---|---|---|
| 2,833,661 | 5/1958 | Iler | 106/84 X |
| 2,905,562 | 9/1959 | Brown | 106/287 S X |
| 2,935,853 | 5/1960 | Weeks et al. | 106/71 X |
| 3,009,829 | 11/1961 | Gouveia | 106/287 SB X |
| 3,574,651 | 4/1971 | Nitzsche et al. | 106/193 J |

*Primary Examiner*—Theodore Morris
*Attorney, Agent, or Firm*—Oblon, Fisher, Spivak, McClelland & Maier

[57] ABSTRACT

An inorganic coating slurry composition with reduced water permeability is formed with 5 – 700 parts by weight of an inorganic filler, 0.1 – 30 parts by weight of a water swellable magnesium silicate or bentonite, 0.1 – 50 parts by weight of a water soluble water repellent, 0.01 – 10 parts by weight of an organic viscosity improver and 100 parts by weight of a silica sol containing a silica content of from 3 – 50 wt percent and at least one alkali component wherein the mole ratio of $SiO_2$ to $M_2O$ is greater than 4 and wherein $M_2O$ represents an alkali metal oxide, ammonium hemihydrate, an amine hemihydrate, a quaternary amine hemihydrate, guanidine hemihydrate or hadrazine hemihydrate.

10 Claims, No Drawings
}

3,895,956

WATER PERMEABILITY REDUCING INORGANIC COATING SLURRY COMPOSITION

BACKGROUND OF THE INVENTION

1. Field of the Invention

This invention relates to an inorganic coating slurry composition which reduces the permeation of water.

2. Description of the Prior Art

Various inorganic coating compositions have been developed which form inorganic membranes on construction surfaces such as concrete, cement, mortar, asbestos plate, or the like. However, these compositions have had certain deficiencies in that they have not been able to completely prevent the permeation of water, they exhibit sedimentation properties and they have not been able to be economically coated on surfaces by curtain flow coating techniques in the factory. For example, water repellent mastic coating compositions (lithin finishing material) have been used to coat concrete surfaces. These compositions have contained white portland cement, pigments, and water repellants and have had to be used by kneading with water before the cement could be cured. Accordingly, this composition has been very inconvenient to use, and the sprayed cement composition is very easily powdered. In particular, the composition especially powders by carbonization after several years.

It has also been known to admix an acrylic resin emulsion and silica sol in a ratio of about 1 : 1 with a fire proofing powder, and to use the coating composition as an inorganic lithin spray. However, the coating composition easily separates by sedimentation, if it is not mixed before it is used. The coating composition contains a substantial amount of the organic resin so that the bentonite and magnesium silicate clays cannot be uniformly swelled sufficiently, and it has been difficult to store the coating composition for long periods of time such as for several months or one year. Because the presence of substantial quantities of organic resins in the coating composition causes the composition to become impregnated with air bubbles, coated membranes formed from the composition contain pin holes, and when the coating composition is applied by a curtain flow coater, slice or cut marks appear in the membrane which forms. In order to prevent these deleterious effects, defoaming agents have had to be added, which results in a decreased water resistance of the coated membrane. This in turn means that the water permeation preventing ability of the coated membrane is lost, which results in poor weather durability and membranes which become yellow and deteriorate.

Inorganic coating compositions are also known which contain aluminum phosphate and a pigment. Although the coating compositions can be applied, to iron plates or asbestos boards, the coating compositions react with the concrete or cement surfaces which results in the formation of bubbles. Moreover, the desired water resistance can not be achieved without heat treating the composition or adding a gelating agent during the curing process.

Yet another coating composition containing water glass and having a molar ratio of $SiO_2$ to $M_2O$ of 2 – 3.3 : 1 such as sodium silicate, potassium silicate or lithium silicate, and an inorganic solid powder such as bentonite, or the like have a high alkalinity which partially dissolves the bentonite and which imparts a greater viscosity to the composition. In addition the compositions are only partially water resistant and do not resist the permeation of water very well. Moreover, even when a polyacrylate or polyalkyleneoxide resin is added to the composition, the desired viscosity increase or a synergistic effect resulting from the interaction of the resin with another additive can not be attained because of the high alkalinity of the composition.

A need, therefore, continues to exist for an inorganic slurry coating composition which has excellent weather durability and water repellancy and which is amenable to conventional coating techniques.

SUMMARY OF THE INVENTION

Accordingly, one object of this invention is to provide an inorganic slurry coating composition which can be readily coated by any one of a variety of methods such as curtain flow coating, which can be kept without showing signs of sedimentation and which provides a coated membrane having excellent weather durability, water repellency, water permeation resistance and heat resistance all of which are ideal properties for coated membranes on construction surfaces.

Briefly, this object and other objects of the invention as hereinafter will become more readily apparent can be attained by providing an inorganic slurry coating composition having a reduced water permeability which comprises 5 – 700 parts by weight of an inorganic powder; 0.1 – 30 parts by weight of a water swellable magnesium silicate clay or bentonite 0.1 – 50 parts of a water soluble water repellent; and; 0.1 – 10 parts of a viscosity improver such as a polyacrylate, polyalkyleneoxide or water soluble cellulose derivative, and 100 parts by weight of a silica sol having a $SiO_2$ content of 3 – 50 percent by weight and having a $SiO_2$ to $M_2O$ mole ratio greater than 4. The coating composition can be coated on construction surfaces to form a water impermeable inorganic coated layer.

DESCRIPTION OF THE PREFERRED EMBODIMENTS

A silica sol which has a silicon oxide/alkaline oxide ($SiO_2/M_2O$) molar ratio greater then 4 is used in the invention because the presence of conventional water glass in the compositions impart the previously described deleterious effects to the coating compositions. Preferably, a silica sol is used which has a molar ratio of $SiO_2/M_2O$ of more than 5. The term "$M_2O$" includes $Na_2O$, $K_2O$, $Li_2O$, $(NH_4)_2O$, $(R_1NH_3)_2O$, $(R_1R_2NH_2)_2O$, $(R_1R_2R_3NH)_3O$, $[R_1R_2R_3R_4N]_2O$, $[NH_2NH_3]_2O$, $[NH_2CNHNH_3]_2O$, $[RNH_3]_2O$, wherein $R_1$, $R_2$, $R_3$ and $R_4$ are lower alkyl groups or aryl groups. The silica sol comprises an alkaline component shown as $M_2O$ which includes compounds such as $Na_2O$, $K_2O$, $Li_2O$, ammonium hemihydrate; the hemihydrates of amines such as dimethylamine, triethanol amine, morpholine; the hemihydrates of quaternary amines, such as isopropanol trimethylamine, triethanol methyl amine; quaternary ammonium compounds such as tetramethyl ammonium hydroxide; guanidine hemihydrate and hydrazine hemihydrate. These alkaline components ($M_2O$) are present as silicates in the silica sol and act as stabilizers. If the molar ratio of $SiO_2$ to $M_2O$ is greater than 250, the aqueous silicate solution of the organosilica sol usually has a pH of 2 – 8. If the molar ratio of $SiO_2$ to $M_2O$ is in the range of 25 – 250, the silica sol exists as an alkali stabilized silica sol or an ammonium or amine stabilized silica sol. If the molar ratio of $SiO_2$ to $M_2O$ is in the range of 4 – 25, the silica sol exists as a silica sol with a fine colloidal particle structure or as an alkali silicate with a high $SiO_2$ to $M_2O$ mole ratio. The silica sol of the invention when incorporated in the coating composition imparts a high heat resistance and water resistance to the composition, and it can be prepared by dissolving a low alkali content silica sol or metallic silicon in an alkaline solution.

The most preferred silica sol for use as the starting material has a $SiO_2$ to $M_2O$ mole ratio of 25 – 20,000 and is suspended in an aqueous or hydrophilic organic solvent. The $SiO_2$ content of the silica sol is usually from 3 – 50 wt percent, preferably from 5 – 43 wt percent. If the $SiO_2$ content is less than 3 percent, the coated layer containing this amount of $SiO_2$ is too weak and has a low water repellency. If the $SiO_2$ content is greater than 50 percent, it is impossible to prevent the slurry from gelling or changing its viscosity for more than one month. Throughout the discussion of the invention, high molar ratio alkali silicates such as ammonium silicate and quaternary ammonium silicate which have a molar ratio of $SiO_2/M_2O$ greater than 4 are referred to as silica sols because they contain some amounts of polysilicate.

The inorganic powder incorporated in the coating compositions include refractory materials, sands from fields, rivers or the sea, glass, pigments, clay minerals, artificial aggregates and the like. The shape of the inorganic powder is not critical and includes spherical, fibril or fiber forms, fine powders and small masses such as powders of silica chamotte, fibrils and fibers of asbestos, rock wool, glass fiber, small masses of vermiculite, volcanic pumice, glass balloons, calcium carbonate, pigment such as iron oxide and titanium oxide. The inorganic powder is preferably a water insoluble material and its selection depends upon the industrial purpose intended. The inorganic powder is used in the coating composition in amounts ranging from 5 – 700 parts by weight of the powder to 100 parts by weight of the silica sol. If the powder is used in amounts less than 5 parts by weight, it is difficult to form continuous coated layers of the composition which have excellent water impermeability effects and good water resistance. If the powder is used in amounts in excess of 700 parts by weight, the viscosity of the resulting composition is too high for use as a slurry. The optimum amount of powder incorporated in the composition is in the range of 10 – 500 parts by weight. Powders which have a relatively low specific gravity such as pigments, fibrous powders are preferably used in amounts ranging from 5 – 100 parts by weight while the powders of silica, zirconia and the like are preferably used in amounts ranging from 50 – 600 parts by weight.

The water swellable, magnesium silicate clay component or the bentonite component of the composition can be added singly or as a mixture in amounts ranging from 0.1 – 30 parts by weight to 100 parts by weight of the silica sol, and is distributed in the areas between the inorganic powder particles as fine particles. This helps to prevent water permeation in the capillaries of the composition, prevents sedimentation and increases the viscosity of the composition. The silica sol impregnates the layer of swelled magnesium silicate clay or bentonite, and drys to form a very hard layer similar to that which results from a hydration reaction when cement cures. The clay can be naturally or synthetically obtained, and other water swellable clays such as aluminum silicate can also be used with the clay or bentonite or can be substituted for either clay or bentonite.

The water soluble repellent component of the composition is preferably an alkali alkyl siliconate, and can be used in an emulsion of a silicon oil having a hydrophilic group at the end of the organopolysiloxane or it can be used in a silicon oil emulsified with an emulsifier. Inorganic powders treated with the silicon oil or a fatty acid or salts thereof can be used. However, they should be uniformly miscible in the slurry. The water repellent component is added to the composition in amounts ranging from 0.1 – 50 parts by weight of the repellent to 100 parts by weight of the silica sol. The optimum effect of a high density coated membrane can be achieved by using 0.5 – 20 parts by weight of an alkali alkylsiliconate. If an inorganic powder coated with the siliconate compound or fatty acid is used in the composition, from 2 – 40 parts by weight of the modified powder are usually preferred.

The polyacrylate component of the composition which is used as the water soluble organic viscosity improver is preferably a monovalent alkali metal, ammonium or amine salt of a polyacrylic acid having a relatively high polymerization degree such as greater than 2,000 and imparts a high viscosity to the final composition. The polyalkyleneoxide component of the composition is preferably a polyethyleneoxide having a molecular weight of 500,000. The water soluble cellulose derivative which can be used in the composition includes methylcellulose, hydroxyl ethylcellulose, carboxyl methyl cellulose, and the like. The viscosity improvers include aqueous solutions or emulsions of modified polyolefinic compounds, alginates, salts of condensed organic acid compounds, natural gums, polysaccarides, and the like. The viscosity improver is added to the composition in amounts ranging from 0.01 – 10 parts by weight to 100 parts by weight of the silica sol depending upon the viscosity required and the other additives which are present. When the polyacrylate, polyalkyleneoxide, water soluble cellulose derivative, or the like viscosity improver is added to the slurry consisting essentially of inorganic materials, the coated layer formed from the composition does not crack, and it does not deteriorate as readily to a powder with age. The viscosity improver is most effective as an alkali salt of polyacrylic acid.

The total effects achieved by the composition of the invention a priori could not be expected to be obtained based on the mere combination of each of the components. The inorganic powder, the water swellable magnesium silicate clay or bentonite, the water soluble water repellent and the water soluble organic viscosity improver in the slurry composition of this invention are uniformly dispersed resulting in a slurry composition having excellent stability. In addition, the composition does not change its viscosity, it does not separate into two layers nor does it solidify by sedimentation. The slurry composition can be kept for a long period of time, and it can be coated with a curtain flow-coater after it has aged, without giving a coated membrane having gashes or cut marks on its surface. The coated membrane when applied to construction surfaces has a suitable water repellency, an excellent water resistance, and ability to prevent water permeation and can be cured to achieve a ceramic-like state with a hardness approaching tile by outside exposure for more than one month. All of the excellent characteristics of the composition can be achieved by uniformly mixing and combining the additives and the silica sol.

The slurry composition of this invention exhibits a broad viscosity range of from 30 to 500,000 c.p., preferably from 30 to 5000 c.p. The coating composition can be applied to surfaces by brushing or spraying. Preferably, it is applied by roll coating at a viscosity of 100 to 500,000 c.p. and also by flow coating at a viscosity ranging from 50 to 10,000 c.p.

Suitable construction surfaces to which the coating composition of this invention can be applied include inorganic and organic construction surfaces such as cement mortar, concrete, gypsum plaster, gypsum board, soil, stone, surfaces coated with an organic paint, asbestos boards, calcium silicate boards, wood, plied woodboards, particle boards, a molded artificial light weight material with an organic or inorganic tackifier, iron born, aluminum, plastic molds and the like. The slurry composition of this invention can be used as an inorganic water permeability reducing composition, an inorganic sealer, a spray lithin composition, a tile shaped lithin base, an inorganic mastic coating composition, an inorganic coating paint or an iron born refractory coating composition.

The slurry composition of the invention has the advantages that it is stable when stored for a long period of time, its viscosity does not change, the pigments and inorganic powders do not settle from the composition and it can be applied to surfaces by several different types of coating apparatus, especially curtain flow coaters even though the slurry composition is formulated from inorganic materials. The inorganic material when coated on construction surfaces has an excellent ability to prevent the permeation of water, as well as having excellent surface hardness, weather durability, heat resistance and water resistance.

In order to achieve a composition with all of the previously mentioned properties, each of the described components in the amounts specified must be blended. The ability of the composition to prevent the permeation of water can be attained temporarily by incorporating a water soluble water repellent, if necessary, in the silica sol. However, the water resistance of the composition soon deteriorates. If the viscosity improver such as polyacrylate, polyalkyleneoxide or water soluble cellulose derivative is omitted from the composition, the water resistance of the composition deteriorates and also the water soluble water repellent separates as flocculation on the upper surface of the composition when it ages. If the slurry composition contains all of the components except the water swellable magnesium silicate clay or bentonite, it is difficult to maintain a uniform dispersion of the water soluble water repellent component in the composition. Furthermore, the viscosity of the composition changes and it becomes highly thixotropic which makes it difficult to use. Also the stability of the slurry composition is insufficient for coating by a spray or a curtain flow coater.

The differences in the characteristics of the slurry composition of the invention and conventional compositions as well as the differences in the properties of the coating composition of the invention coated on a construction surface as opposed to a conventional composition coated on a construction surface are shown in Table I.

TABLE I

A Comparison of the Coating Composition of the Invention with Conventional Compositions

| | | Composition of invention | Conventional Composition | | | | |
|---|---|---|---|---|---|---|---|
| | | | A | B | C | D | E |
| silica sol | | O | X | O | O | O | O |
| inorganic powder | | O | O | X | O | O | O |
| water swellable bentonite | | O | O | O | X | O | O |
| water repellent | | O | O | O | O | X | O |
| viscosity improver | | O | O | O | O | O | X |
| slurry | coating by curtain flow coater | good | no slurry | bad | bad | bad | bad |
| | viscosity change in ageing | good | no slurry | bad | bad | good | bad |
| | sedimentation prevent | good | no slurry | bad | bad | good | good |
| | separation into two layers | good | no slurry | bad | bad | good | bad |
| | separation of water repellent | good | no slurry | bad | bad | — | bad |
| coated layer | water permeation preventing effect | good | no slurry | bad | bad | bad | bad |
| | water resistance | good | no slurry | bad | bad | bad | bad |
| | weather durability | good | no slurry | bad | good | good | good |
| | heat resistance | good | no slurry | good | good | good | good |
| | surface hardness | good | no slurry | bad | bad | bad | bad |

O designates the amount of a component which is present in amounts within the amounts claimed in this invention
X designates the amount of a component which is present in amounts less than the amounts claimed in this invention Table II shows a comparison of the properties of the coating composition of the invention with various other coating compositions as well as a comparison of those materials when coated on construction surfaces.

TABLE II

Comparison of the Coating Composition of the Invention and Conventional Coating Compositions

| | Properties of coating compositions | | | Properties of coated layers | | | | |
|---|---|---|---|---|---|---|---|---|
| | pot life | preservation properties | curtain flow coater | heat resistance | water resistance | water permeation prevention | hardness of surface | weather durability |
| Composition of the invention | O | O | O | O | O | O | O | O |
| inorganic coat composition | X | X | X | O | Δ | X | O | O |
| cement type water proofing | X | X | X | O | O | O | X | X |
| organic water proofing | O | Δ | O | X | O | O | X | X | combines the properties of no sedimentation and a viscosity increase.
O = good
X = bad
Δ = less than satisfactory The slurry composition of the invention can be admixed with a curing accelerator. Suitable curing accelerators include dicalcium silicates, fluorosilicates, carbonates, ferrosilicon, phosphates, and the like. It is also possible to add a thermal decomposition foaming agent, a surfactant, a metal powder (aluminum) and an alkali hydroxide to the composition to prepare a coated layer of light weight or having heat insulation properties. The slurry composition of the invention can be applied on construction surfaces and also can be effectively applied as an outer coating on chemical plants and electric facilities. It can also be used to prevent water leakage in construction materials and also as a repair material in the ceramic industry.

Having generally described the invention, a further understanding can be obtained by certain specific examples which are provided herein for purpose of illustration only and are not intended to be limiting in any manner. In the examples the term "part" designates "part by weight."

EXAMPLE 1

Into a stainless steel beaker equipped with a small stirrer was charged 100 parts of an aqueous silica sol containing 15 wt percent $SiO_2$ and having a molar ratio of $SiO_2$ to $M_2O$ of 30 which was prepared with monoethyl triethanol ammonium hydroxide. 1 Part of magnesium silicate clay and 3 parts of bentonite were then added to the beaker with stirring for 30 min, followed by 10 parts of sodium methyl silconate, 80 parts of quartz powder (325 mesh pass) and 1 part of powdery sodium polyacrylate having a polymerization degree of 40,000, with stirring for 3 hours whereby a slurry having a viscosity of 490 c.p. was obtained. The slurry was kept in a sealed glass bottle at room temperature. However, no sedimentation nor powder flocculation was found even after the material was stored for 3 months. Also the viscosity of the slurry was 510 c.p. and had not substantially changed after 3 months.

The slurry could be coated onto an asbestos board, a calcium silicate board or a wood board with a curtain flow coater without having gashes or cut marks appearing on the membrane. When the slurry was coated at a rate of 0.5 kg/m², a hard membrane whose surface had no cracks was formed. According to a water permeation prevention test, an untreated asbestos board having a permeability of 1.80 cc/cm²/day was modified by a coating treatment with the composition whereby a permeability of 0.12 cc/cm²/day was attained. Similarly, an untreated calcium silicate board having a permeability of about 60 cc/cm²/day was modified by a coating treatment with the composition whereby a permeability of 0.22 cc/cm²/day was attained.

The slurry was admixed with an inorganic pigment to form a water permeability reducing inorganic paint, which was coated on a wooden board. The surface hardness and water resistance of the board were improved by the treatment. The pigmented composition could be applied by a spray coating or a roll coating method.

EXAMPLE 2

A mixture of potassium hydroxide and sodium hydroxide was dissolved in an aqueous silica sol very slowly whereby a material having a $SiO_2$ to $M_2O$ ratio of 4.8 with a $SiO_2$ content of 20 percent by weight was obtained. The mixture was aged in order to prepare a transparent aqueous dispersion. Into a stainless steel beaker equipped with a small stirrer were charged 100 parts of the prepared dispersion, 8 parts of bentonite, 500 parts of powdery zirconium silicate (20μ pass), 3 parts of chromium oxide pigment and 50 parts of chamotte having a diameter of about 2 mm with stirring for 1 hour. 3 Parts of sodium methylsiliconate and 0.3 part of methyl cellulose were added to the mixture with stirring for 2 hours. The slurry had a viscosity of about 2600 c.p. The slurry was uniformly sprayed by a spray gun on a decoration finishing surface of a precast concrete at a rate of 1 kg/m² whereby a pale yellowish-green colored decorative coating was formed on the concrete. Water was applied to the surface after 1 month and the surface resisted water permeation and was water repellent. The hardness of the surface approximated a pencil hardness of 1H after 3 days. However, the hardness increased to a pencile hardness value greater than 8H after 6 months. The surface was heated by flame and a ceramic type coating possessing substantial hardness, high gloss without cracking and no water permeability was formed.

EXAMPLE 3

A transparent colloidal silica sol having a $SiO_2$ content of 8 percent by weight was prepared by admixing silica sol with a particle size diameter of about $2\mu$ with an equimolar mixture of sodium hydroxide and dimethyl ethanol ammonium hydroxide whereby a sol with a $SiO_2$ to $M_2O$ mole ratio of 4.8 was prepared. The mixture was heated for 6 hours at a temperature of 70°C in a universal mixer. Into a stainless steel beaker equipped with a stirrer were charged 100 parts of the silica sol, 0.4 part of a water swellable magnesium silicate clay and 5 parts of ammonium polyacrylate having a polymerization degree of 20,000 with stirring for about 4 hours. The mixture was transferred to a universal mixer and admixed with 20 parts of asbestos fibriles, 10 parts of pearlite and 5 parts of fine mica which was treated with 5 percent by weight of dimethylpolysiloxane at 260°C for 1 hour. The mixture was kneaded to form a light weight pasty coating material having a viscosity of about 200,000 c.p. The coating material was coated on an iron pole by a knife to a thickness of about 25 mm whereby a heat insulation layer having an apparent density of about 0.6 and having a high adhesiveness was obtained after the composition dried. The heat insulation layer was a clean surface and no asbestos dust such as a cement sprayed asbestors was present on the surface. Furthermore, when the surface was directly heated with a flame, it did not melt or crack although it did expand.

The sealed, paste-like coating material was kept for 1 month. However, it did not form a gel in this period. The surface layer was water resistant and it absorbed no water after it was dried.

EXAMPLE 4

100 Parts of a silica sol having a $SiO_2$ content of 35 percent by weight and prepared by adding sodium hydroxide to a silica sol to achieve an $SiO_2$ to $M_2O$ mole ratio of 100 was charged into a beaker made of polyethylene. 2 Parts of a water swellable magnesium silicate clay, 10 parts of bentonite, 40 parts of sodium methyl silconate, 5 parts of sodium polyacrylate having a polymerization degree of about 500,000, 10 parts of micro-mica powder and 2 parts of an iron oxide pigment were added to the beaker with stirring by a small stirrer and the stirring was continued for about 8 hours whereby a transparent slurry having a viscosity of 800 c.p. was obtained. The slurry was coated on a gypsum board with a curtain flow coater at a rate of 0.2 kg/m² without any surface gashes or marks appearing. The coated surface was dried for one day and a hard, water resistant - fire resistant layer which looked like an enamel finish was formed.

EXAMPLE 5

90 Parts of a silica sol having a $SiO_2$ content of 18 percent by weight prepared by adding sodium hydroxide to a silica sol to achieve an $SiO_2$ to $M_2O$ mole ratio of 1070 and 10 parts of methanol were charged to a universal mixer. 15 Parts of water, 1 part of a water swellable magnesium silicate clay, 5 parts of an amine modified bentonite, 2 parts of ammonium methylsiliconate, 40 parts of a stearic acid coated silica powder and 0.08 part of polyethyleneoxide powder were admixed separately in a kneader for 12 hours to form a paste. The paste was charged to the universal mixer and 150 parts of a fine silica powder and 50 parts of white chamotte having a particle diameter of 1.5 mm were added to the mixture and kneaded for about 1 hour whereby a paste having a viscosity of about 60,000 c.p. was obtained. The paste had the same viscosity after it had been aged for one month.

The paste was sprayed by a spray gun as a coating on a concrete surface at the rate of 24 kg/m² whereby a decorated water resistant and water impermeable inorganic plane layer was formed which had no surface cracks. In a water permeability test, the layer had a water permeability of only 0.10 cc/cm²/day and the layer was easily formed with one spray application without any special kneading before the application. The coated layer could be covered with an acryl type colored paint or a clear paint if desired.

EXAMPLE 6

An equimolar mixture of sodium hydroxide, ammonium hydroxide, tetraethanol ammonium hydroxide and guanidine was added to a silica sol having a silica content of 40 percent (which contained no alkali) to attain a pH of 2.5 in order to form a silica sol having a $SiO_2$ to $M_2O$ mole ratio of 8, with a silica content of 28 percent, which is a high mole ratio alkali silicate solution. 100 Parts of the high mole ratio alkali silicate solution was charged to a stainless steel beaker equipped with a small stirrer and 0.5 part of a water swellable magnesium silicate, 0.8 part of sodium methylsiliconate, 0.02 part of hydroxyethyl cellulose, 10 parts of kaolin powder and 50 parts of a fine quartz powder were added to the beaker whereby a slurry having a viscosity of 320 c.p. was obtained. The slurry was applied to a concrete surface wet by ground water. After 1 day, the surface was dried and the water proofing ability of the surface was determined. The coated surface was cut by a cutting device and the surface was observed. It was found that the silicate had immersed into the layer by several mm whereby it had hardened and acted as an effective seal against water.

EXAMPLE 7

An equimolar mixture of lithium hydroxide and hydrazine was added to silica sol so as to form a silica sol having a $SiO_2/M_2O$ mole ratio of 7.5 and having a $SiO_2$ content of 25 percent. 100 Parts of the silica sol, 5 parts of micro-mica, 5 parts of asbestos fine powder, 13 parts of talc powder, and 3 parts of a water swellable magnesium silicate clay were admixed in a beaker equipped with a small stirrer for 20 min. 5 Parts of a siliconate emulsion, 2 parts of a powdery sodium polyacrylate having a polymerization degree of about 40,000, 17 parts of an acrylic resin and 1 part of a brown iron oxide pigment were further added to the mixture with stirring for 20 min. whereby a colored inorganic coating material having a viscosity of 300 c.p. was obtained. The coating material was coated on an aluminum plate having an unsealed alumite membrane and on a washed aluminum plate having no alumite membrane. After drying for 2 days in air, no cracks had formed in the continuous, hard coated layers. The coated layers were not etched or corroded by immersions in 10 percent NaOH and were still water repellent despite this treatment. When the plates were kept outside for 3 months, they did not change color nor did any surface cracks appear.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A coating slurry composition with reduced water permeability which comprises 5 – 700 parts by weight of an inorganic filler other than a water swellable magnesium silicate or bentonite, 0.1 – 30 parts by weight of a water swellable magnesium silicate, bentonite, or mixtures thereof, 0.1 – 50 parts by weight of a water repellent, selected from the group consisting of an alkali alkyl siliconate and inorganic powders coated with an alkali alkyl siliconate or a fatty acid or salts thereof, 0.01 – 10 parts by weight of an organic viscosity improver selected from the group consisting of a monovalent alkali metal, ammonium or amine salt of a polyacrylic acid having a degree of polymerization of at least 2000, polyethyleneoxide of 500,000 molecular weight and a water soluble cellulose derivative and 100 parts by weight of a silica sol containing a silica component ranging from 3 – 50 weight percent and at least one alkali component wherein the mole ratio of $SiO_2$ to $M_2O$ is greater than 4 and wherein $M_2O$ represents an alkali metal oxide, ammonium hemihydrate, an amine hemihydrate, guanidine hemihydrate or hydrazine hemihydrate.

2. The slurry composition of claim 1, wherein said silica sol has a $SiO_2$ to $M_2O$ mole ratio of 25 to 20,000.

3. The slurry composition of claim 1, wherein said silica sol is prepared by adding an alkaline material to a silica sol having a low alkaline material content.

4. The slurry composition of claim 3 wherein said alkaline material is an alkali metal hydroxide or carbonate or ammonia, an amine, a quaternary amine, quanidine or hydrazine.

5. The slurry composition of claim 1, wherein the molar ratio of $SiO_2$ to $M_2O$ is in the range of from 25 to 20,000.

6. The slurry composition of claim 1, wherein the inorganic filler is selected from the group consisting of refractory materials, sand, glass pigments and clay minerals.

7. The slurry composition of claim 1, wherein the amount of inorganic filler present is from 10 to 500 parts by weight.

8. The slurry composition of claim 1, wherein the alkali alkyl siliconate is present in an amount therefrom 0.5 to 20 parts by weight.

9. The slurry composition of claim 1, which also contains a curing accelerator, thermal decomposition foaming agent, a surfactant, a metal powder and an alkali hydroxide.

10. The slurry composition of claim 9, wherein the curing accelerator is selected from the group consisting of dicalcium silicate, fluorosilicates, carbonates, ferrosilicon and phosphates.

* * * * *